(12) United States Patent
Won

(10) Patent No.: US 10,635,268 B2
(45) Date of Patent: *Apr. 28, 2020

(54) LAYERED CONTENT SELECTION

(71) Applicant: Microsoft Technology Licensing, LLC, Redmond, WA (US)

(72) Inventor: Sung Joon Won, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/242,814

(22) Filed: Jan. 8, 2019

(65) Prior Publication Data
US 2019/0146642 A1    May 16, 2019

Related U.S. Application Data

(63) Continuation of application No. 15/350,403, filed on Nov. 14, 2016, now Pat. No. 10,216,368.

(51) Int. Cl.
| | |
|---|---|
| G06F 17/00 | (2019.01) |
| G06F 3/0482 | (2013.01) |
| G06F 3/0484 | (2013.01) |
| G06F 9/451 | (2018.01) |
| G06F 3/0488 | (2013.01) |

(52) U.S. Cl.
CPC .......... *G06F 3/0482* (2013.01); *G06F 3/0488* (2013.01); *G06F 3/04842* (2013.01); *G06F 9/451* (2018.02); *G06F 2203/04804* (2013.01)

(58) Field of Classification Search
CPC .. G06F 3/0482; G06F 3/0488; G06F 3/04842; G06F 9/451; G06F 2203/04804; G06F 17/211; G06F 17/24; G06F 17/2247; G06F 17/248; G06F 17/218

See application file for complete search history.

(56) References Cited

U.S. PATENT DOCUMENTS

| | | | |
|---|---|---|---|
| 2006/0206807 A1* | 9/2006 | Rosner | G06F 17/248 715/234 |
| 2014/0215336 A1* | 7/2014 | Gardenfors | G06F 3/017 715/719 |

* cited by examiner

*Primary Examiner* — Scott T Baderman
*Assistant Examiner* — Hassan Mrabi
(74) *Attorney, Agent, or Firm* — NovoTechIP International PLLC

(57) ABSTRACT

Non-limiting examples of the present disclosure describe functionality for content selection that efficiently enables block copying of content from an executing application even when content is traditionally non-selectable in the executing application. An application may be executing, for example, on a computing device. Input may be received that triggers activation of a user interface for content selection. A layered view of the application and the user interface may be presented based on the received input. As an example, the layered view presents the user interface layered over the application. A block portion of content from the application may be selected based on a single action. Among other examples, the single action may be a non-continuous device click or a non-continuous touch input processed through the user interface. Additional action(s) for the selected block portion of content may be accessible through the user interface.

20 Claims, 10 Drawing Sheets

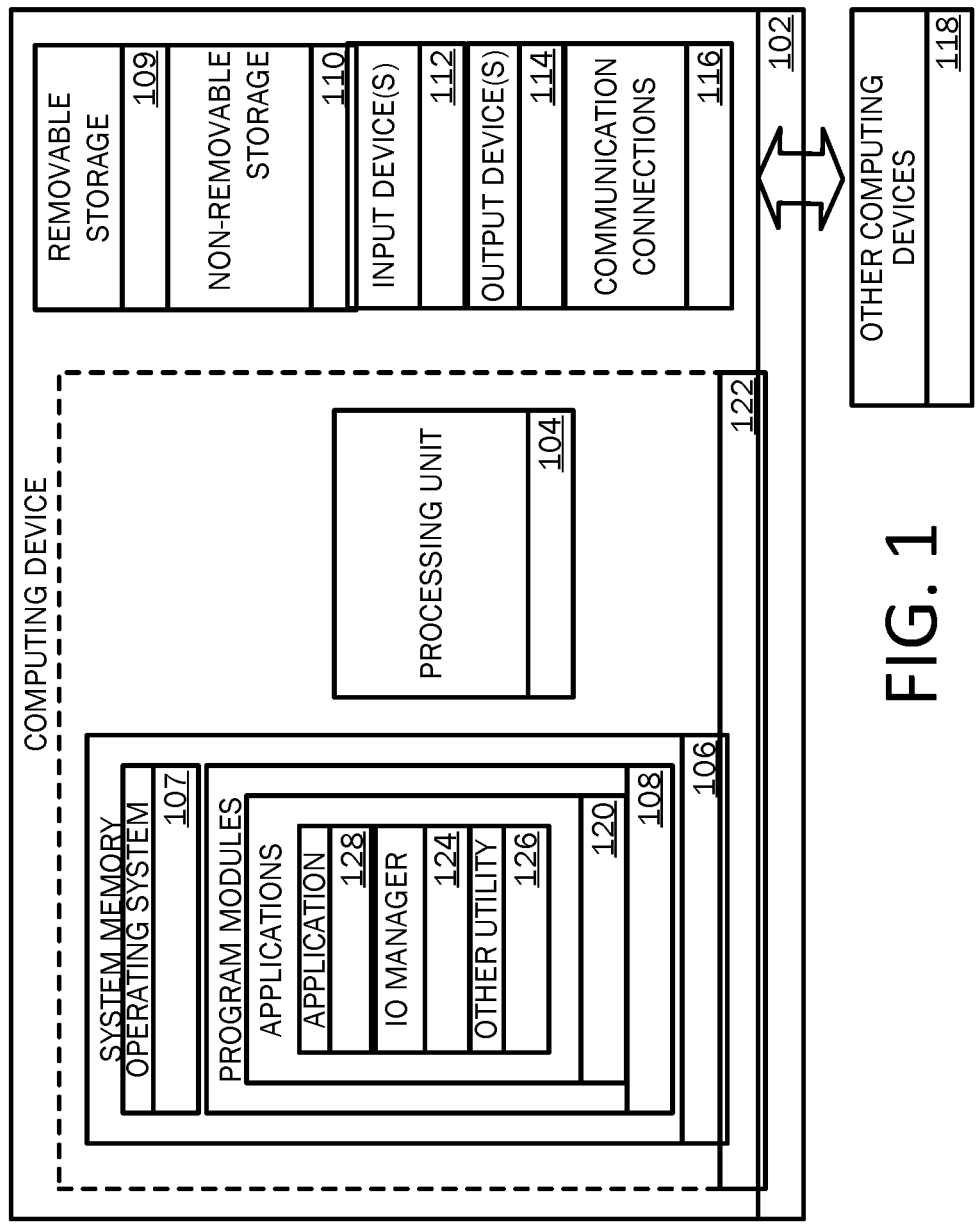

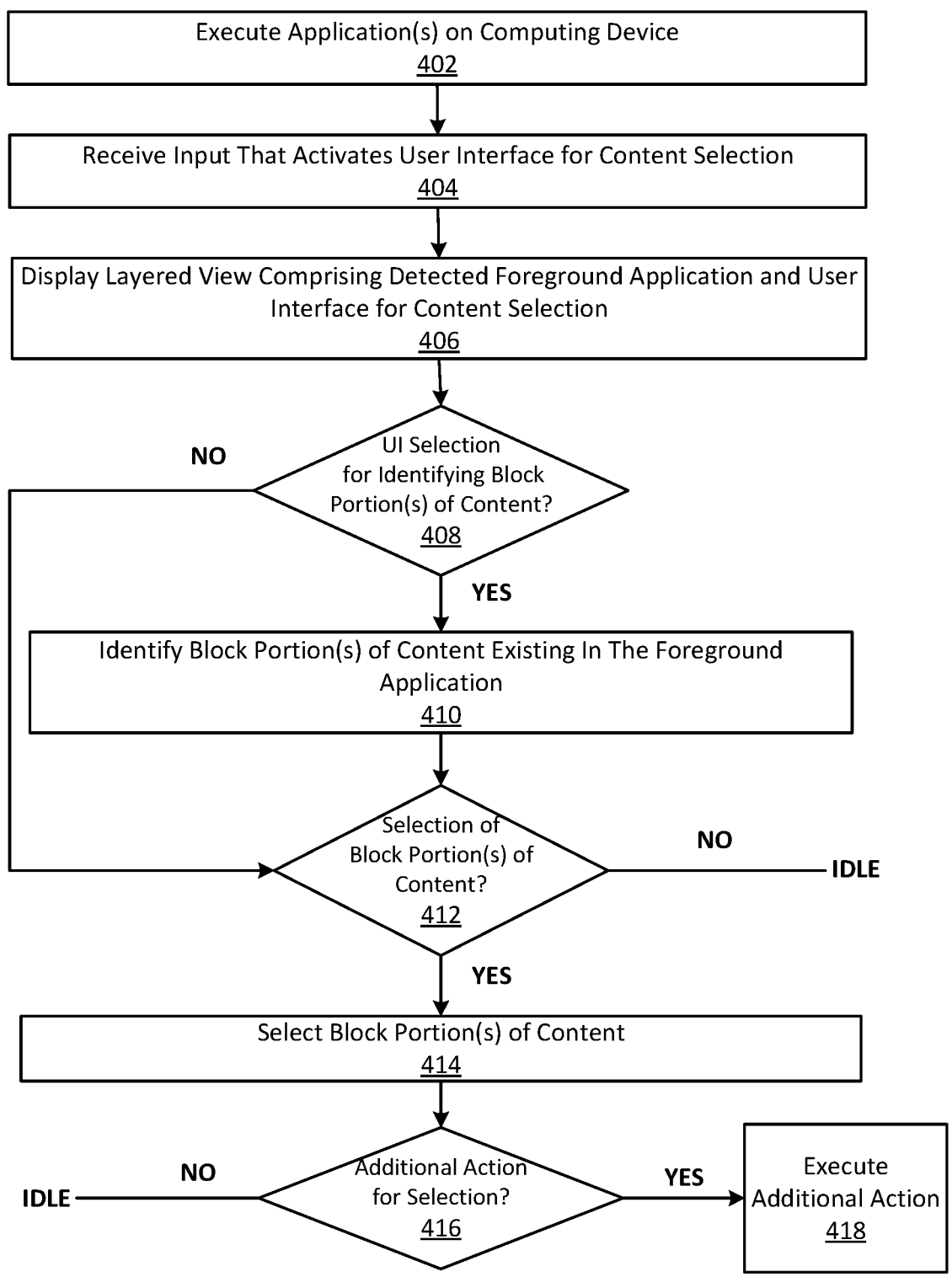

500

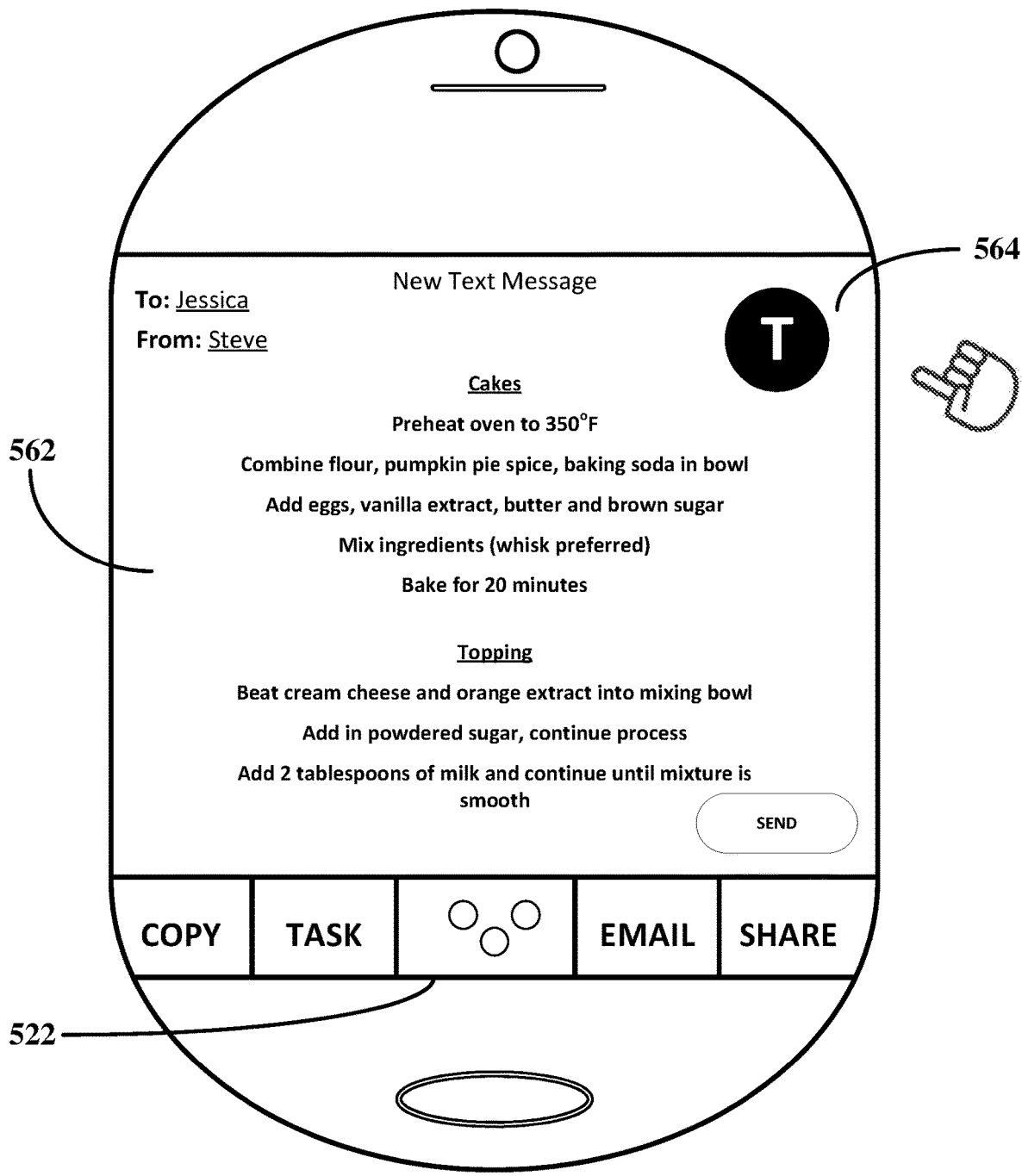

600

LAYERED CONTENT SELECTION

CROSS REFERENCE TO RELATED PATENT APPLICATIONS

This application is a continuation of and claims priority to U.S. Non-Provisional patent application Ser. No. 15/350,403, entitled "LAYERED CONTENT SELECTION", filed on Nov. 14, 2016, which is hereby incorporated by reference herein, in its entirety.

BACKGROUND

New applications/services have increased productivity in many ways. A common desire is for users to be able to copy content from one application and paste that content in another application. However, some applications are not configured to enable content to be directly copied. Even when content can be copied from applications, the process for selecting and copying content is cumbersome. To achieve a selection of content, users are required to perform several actions such as: a first action (e.g. press and hold) to request display of a selection box for selecting content, multiple actions for clicking and dragging a selection box over the content the user wishes to select and a subsequent action to select the content. As such, examples of the present application are directed to the general technical environment related to improving efficiency for selection of content.

SUMMARY

Non-limiting examples of the present disclosure describe functionality for a content selection application that efficiently enables block copying of content from an executing application even in instances where content is traditionally non-selectable in the executing application. An application may be executing, for example, on a computing device. Input may be received that triggers activation of a user interface for content selection. As an example, input triggering activation of the user interface may be received through the computing device. A layered view of the application and the user interface may be presented based on the received input. As an example, the layered view presents the user interface layered over the application. A block portion of content from the application may be selected based on a single action. Among other examples, the single action may be a non-continuous device click or a non-continuous touch input processed through the user interface. Additional action(s) for the selected block portion of content may be accessible through the user interface.

In other non-limiting examples, a user interface for content selection may be incorporated in an exemplary content selection application. A first application may be executed, for example, by a computing device. Input may be received that triggers activation of a second application. As an example, the second application is an exemplary content selection application. A layered view of the first application and the second application may be presented based on the received input. As an example, the layered view presents the second application layered over the first application. A block portion of content from the first application may be selected based on a single action. As an example, the single action may be processed by the second application. Additional action(s) for the selected block portion of content may be accessible through an exemplary content selection application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1 is a block diagram illustrating an example of a computing device with which aspects of the present disclosure may be practiced.

FIG. 4 is an exemplary method related to content selection processing which aspects of the present disclosure may be practiced.

FIGS. 5A-5D present exemplary user interface views for processing associated with an exemplary content selection application with which aspects of the present disclosure may be practiced.

DETAILED DESCRIPTION

Figure 2A:
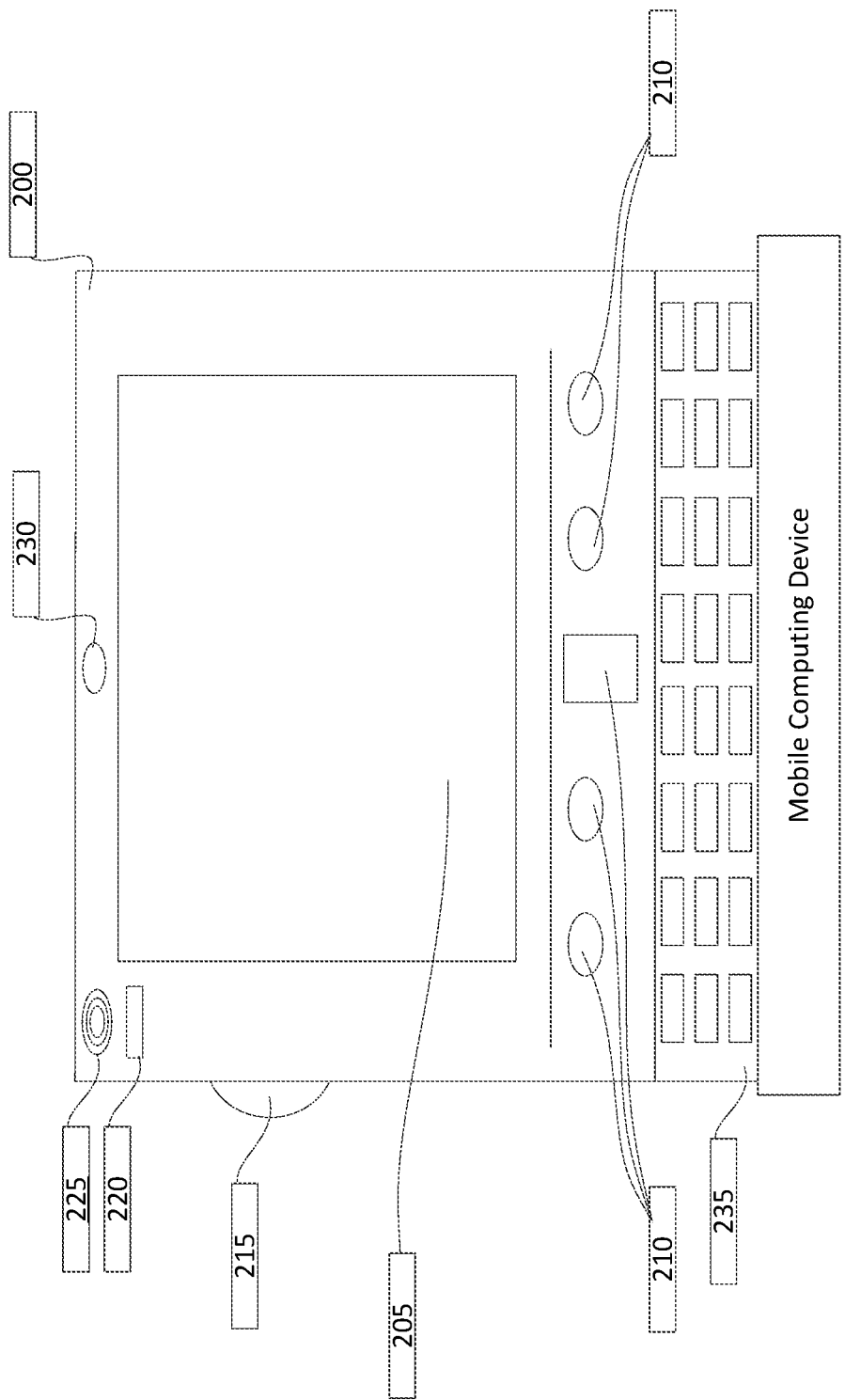
FIGS. 2A and 2B are simplified block diagrams of a mobile computing device with which aspects of the present disclosure may be practiced.

Non-limiting examples of the present disclosure describe functionality for a content selection application that efficiently enables block copying of content from an executing application even in instances where content is traditionally non-selectable in the executing application. An exemplary user interface for content selection is described that interfaces with other executing applications to enable quick and efficient selection of content without the need to perform numerous actions (e.g. click/drag/select/copy) when attempting to select content. In examples described herein, a block portion of content can be selected using a single, non-continuous action. This not only improves a user interaction with a computing device when attempting to copy block portions of content but also improves processing efficiency for a computing device that is being utilized to copy block portions of content. As an example, a user interface for content selection may be a component of a content selection application. The content selection application interfaces with other executing applications to enable one or more portions of content to be copied from another executing application even in cases where a portion of the content is non-selectable directly from the application.

An exemplary content selection application is configured to provide user interface features that identify block portions of content and enable a user to efficiently select one or more block portions of content. In some examples, a block portion of content may contain one or more snippets of content. A snippet of content may comprise one or more words/characters/numbers/icons etc. In further examples, a snippet of content may comprise other media including images, video, audio, handwritten input, etc. In examples where text portions are being selected, a block portion of content may comprise two or more snippets of content. Alternatively, a block portion of content may comprise any combination of content types, for example, a snippet of text content and a snippet of media content. In some cases, a snippet of content may be non-selectable when using an application other than an exemplary content selection application. In at least one example, a block portion of content (selected through an exemplary content selection application) may comprise at least one snippet of content that is non-selectable in an application other than the content selection application.

The user interface for content selection may be presented in a layered view, where the user interface (e.g. of content selection application) is displayed in a layer that is provided over another layer representing an executing application comprising portions of content. An exemplary content selection application may be configured to detect an application executing in a foreground of a computing device (e.g., detected foreground application). When the content selection application is activated, the content selection application is layered over the detected foreground application, which provides a user with an ability to view and access content of the foreground application while having access to functionality of the content selection application. Quick access to additional actions for selected content are also provided through an exemplary content selection application. The content selection application is further configured to provide user interface features that enable quick access to additional actions for selected content. Examples of additional actions include but are not limited to: copying, adding selected content to a task list, emailing the selected content, sharing the selected content with other users/applications, and editing the selected content, among other examples. Moreover, in further examples, an exemplary content selection application may be configured to prioritize user interface features that are displayed for a user. In at least one example, one or more user interface features displayed in a content selection user interface may be dynamically presented (or updated) based on one or more of: selected content (e.g. type, format, context, etc.), associated metadata of the content, a type of application from which the content is selected from, and types of on-going processes executing on a client computing device, among other examples. For instance, a content selection application may detect that a block portion of text content is being copied from a web browsing application and present user interface features for pasting that block portion of content in a messaging application, email application and/or word processing application.

Accordingly, the present disclosure provides a plurality of technical advantages including but not limited to: an ability to select content in a single, non-continuous action, ability to efficiently identify and select block portions of content, ability to make portions of content selectable even when the content is non-selectable directly from an application, more efficient operation of processing devices (e.g., saving computing cycles/computing resources) for accessing and utilizing an exemplary content selection application, improving user interaction between a user and a computing device executing an exemplary content selection application and extensibility to integrate different applications/services within an exemplary content selection application to extend functionality, among other examples.

Figure 2B:
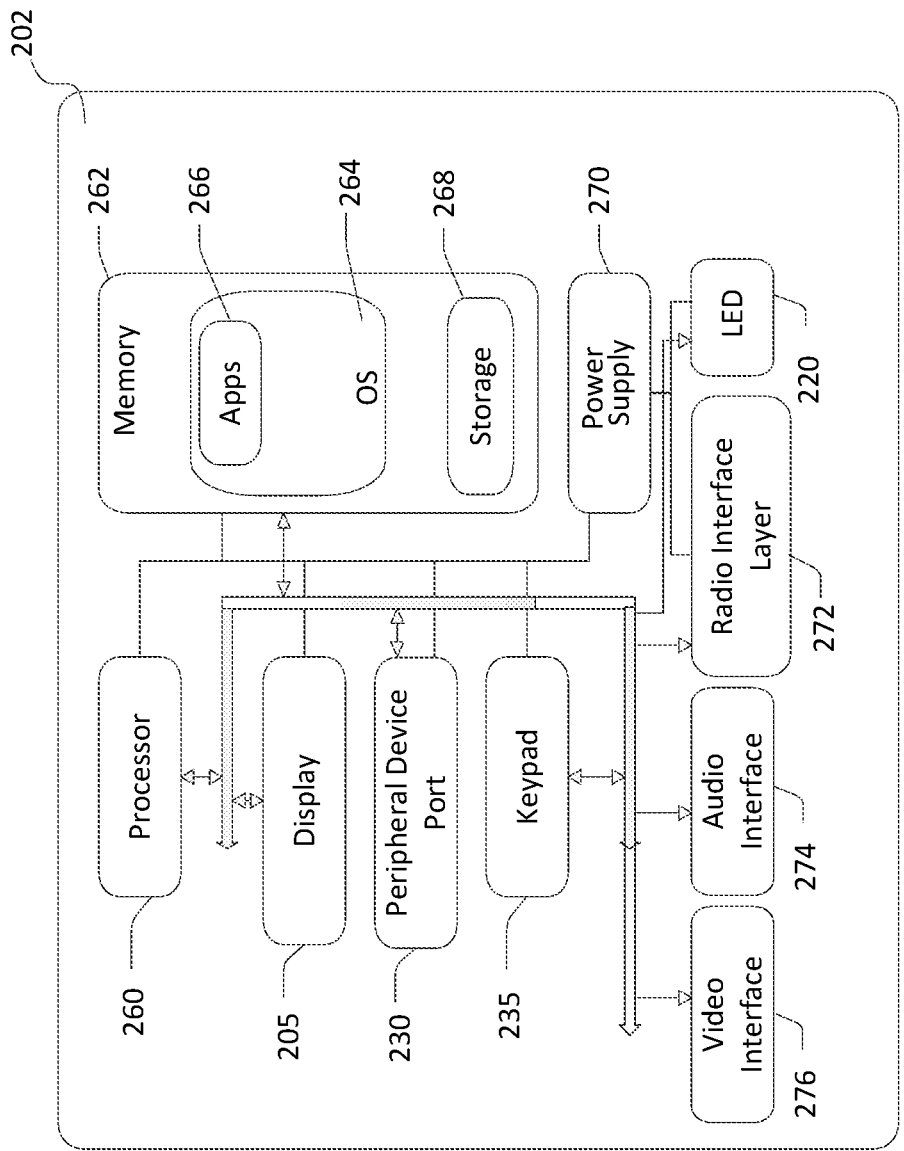
Figure 3:
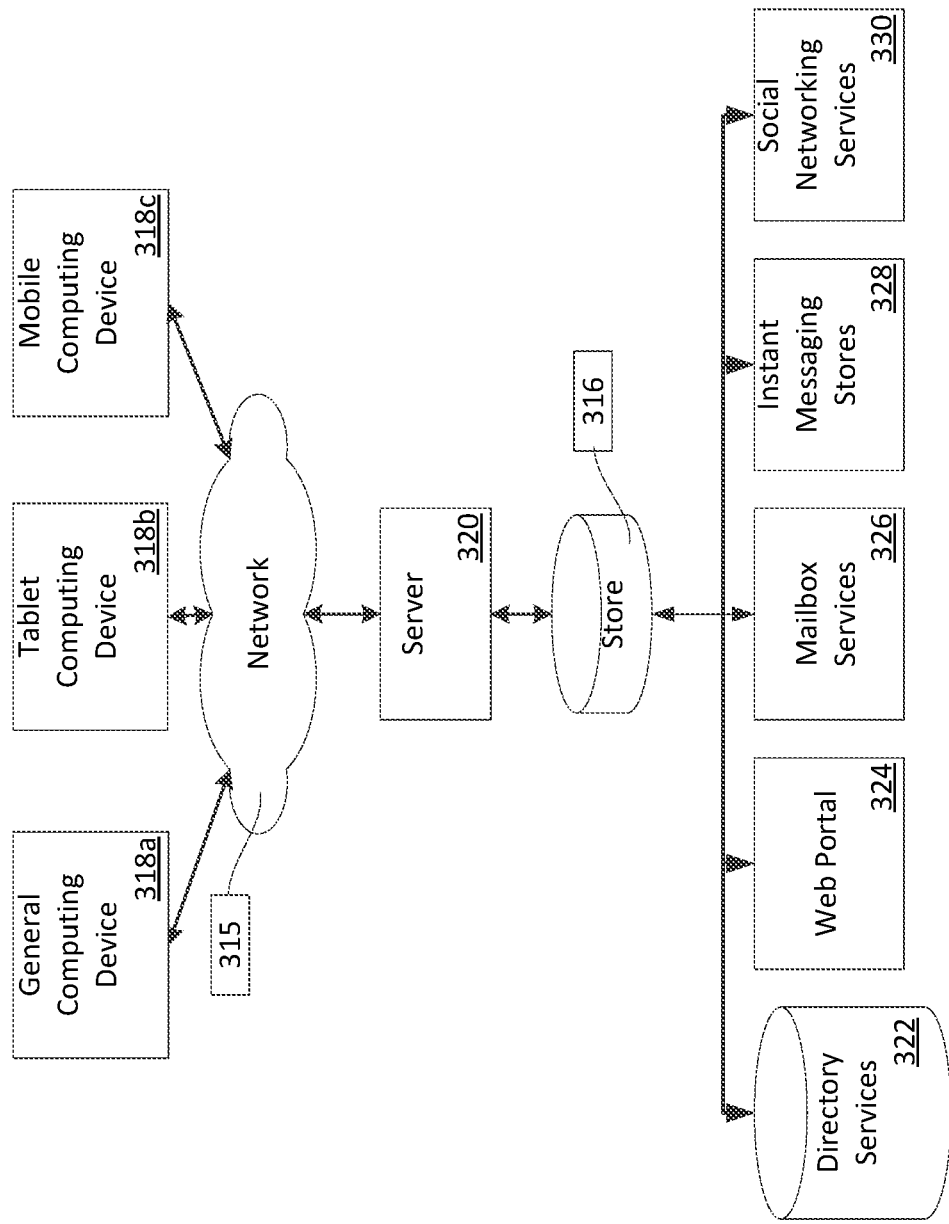
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. Among other examples, computing device 102 may be an exemplary computing device configured for execution of an exemplary content selection application/service. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 102 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. Mobile computing device 200 may be an exemplary computing device configured for execution of an exemplary content selection application/service. Application command control may be provided for applications executing on a computing device such as mobile computing device 200. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device (e.g. system 202) described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225 (as described in the description of mobile computing device 200). In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225 (shown in FIG. 2A), the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. The system of FIG. 3 may be an exemplary system configured for execution of an exemplary content selection application/service. Target data accessed, interacted with, or edited in association with programming modules 108 and/or applications 120 and storage/memory (described in FIG. 1) may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and a client node may be implemented for connecting to network 315. Examples of a client node comprise but are not limited to: a computing device 102 embodied in a personal computer, a tablet computing device, and/or by a mobile computing device 200 (e.g., mobile processing device). As an example, a client node may connect to the network 315 using a wireless network connection (e.g. WiFi connection, Bluetooth, etc.). However, examples described herein may also extend to connecting to network 315 via a hardwire connection. Any of these examples of the client computing device 102 or 200 may obtain content from the store 316.

FIG. 4 is an exemplary method 400 related to content selection processing in which aspects of the present disclosure may be practiced. As an example, method 400 may be executed by an exemplary processing device and/or system such as those shown in FIGS. 1-3. In examples, method 400 may execute on a device comprising at least one processor configured to store and execute operations, programs or instructions. Operations performed in method 400 may correspond to operations executed by a system and/or service that executes computer programs, application programming interfaces (APIs), neural networks or machine-learning processing, among other examples. As an example, processing operations executed in method 400 may be performed by one or more hardware components. In another example, processing operations executed in method 400 may be performed by one or more software components. In some examples, processing operations described in method 400 may be executed by one or more applications/services associated with a web service that has access to a plurality of application/services, devices, knowledge resources, etc. In alternate examples, processing operations described in method 400 may be implemented by one or more components connected over a distributed network, for example, as described in system 600 (of FIG. 6). While method 400 is written from the perspective of a client computing device, the claimed invention may extend to embodiments written from the perspective of a client device, server device and/or a system that comprises multiple computing devices.

Method 400 begins at processing operation 402, where one or more applications are executing on a computing device. Examples of a computing device have been previously provided in the description of FIGS. 1-3. Additional examples of a computing device are subsequently provided in the description of FIG. 6 (e.g. processing device 602). In one example, a computing device is a mobile device such as a mobile phone, tablet, laptop, wearable device, etc.

A computing device may be executing (processing operation 402) one or more application/services. Applicable examples do not limit the type of application/service, such that an application/service may be any kind of application that includes content, whether the content is provided directly by the application/service provider or accessed from another resource. Examples of applications/services include operating system (OS) services, for example, that provide OS content on a home screen of a computing device. In some cases, content of an application/service may not be selectable from within an application/service that is used to access the content. For example, an executing application/service may not possess select/copy/paste functionality.

Flow may proceed to processing operation 404, where an input is received that activates an exemplary content selection application. An exemplary content selection application/service is configured to interface with other executing applications to enable quick and efficient selection of content without the need to perform numerous actions (e.g., click/drag/select/copy) when attempting to select/copy content. The content selection application is configured to provide user interface features that identify block portions of content and enable a user to efficiently select one or more block portions of content. The content selection application is also configured to interface with a computing device (executing the content selection application and/or other applications/services) to improve processing efficiency for access to the content selection application. Examples of an exemplary content selection application are provided in at least FIGS. 5A-5D.

Figure 5A:
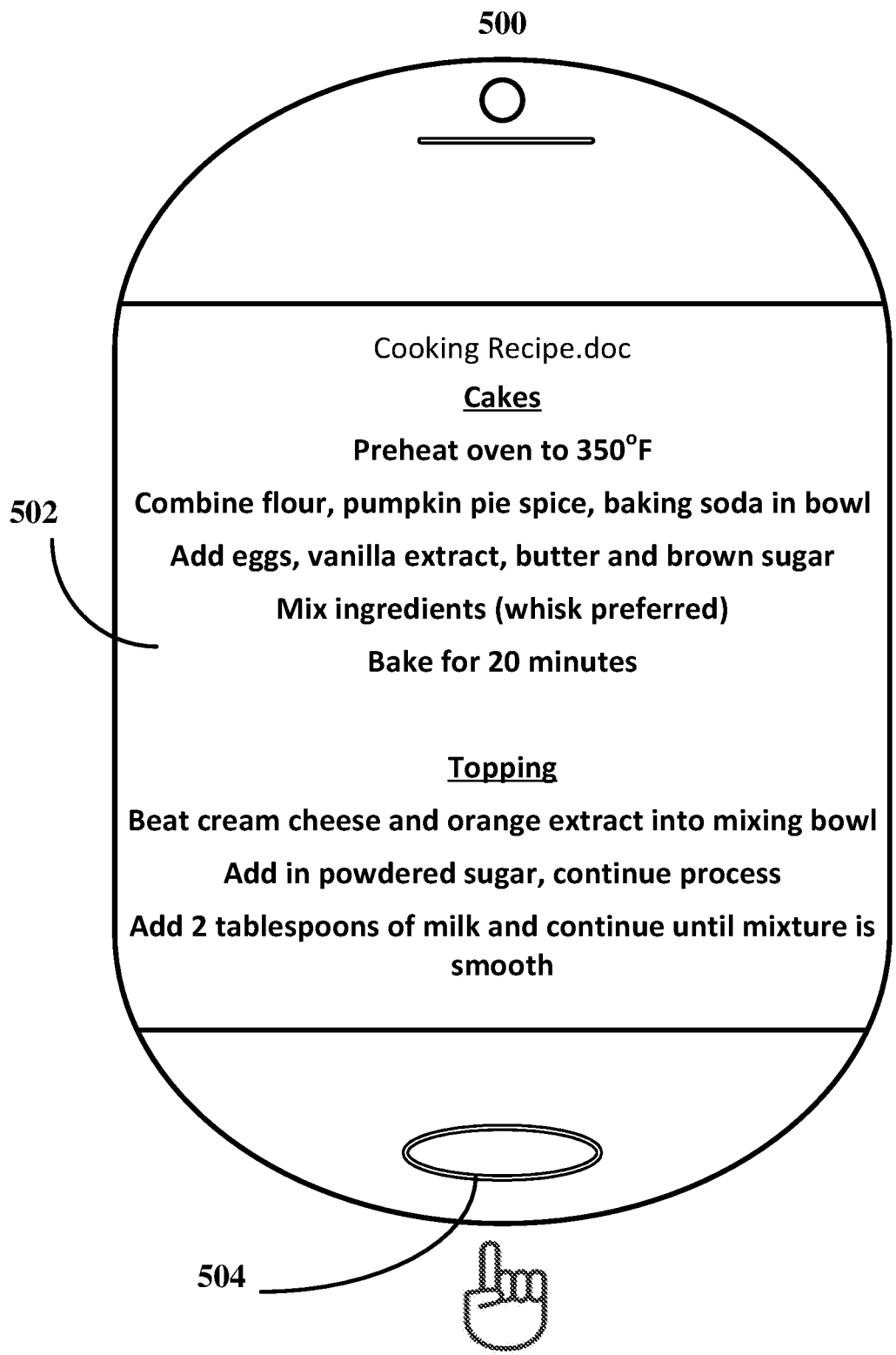

In processing operation 404, activation of an exemplary content selection application may include examples where the content selection application is launched (e.g., when not already active) or examples where display of the content selection application is recalled (e.g., content selection application is already running). Receiving (processing operation 404) of an input to activate a content selection application comprises detecting, through an interaction with the computing device, an intent to access the content selection application. Examples of input that may be received that indicate an intent to activate a content selection application include but are not limited to: selection of an application/service icon for the content selection application through touch or device input, receipt of a spoken utterance requesting access to the content selection application, selection of a user interface add-on displayed within an executing application/service, and an interaction with a component of a computing device (e.g., gesture, hot key selection, pressing a button). In one example an action such as pressing and holding down a home key of a mobile computing device may be a trigger for activation of a user interface of the content selection application. For instance, an exemplary content selection application may be executing in a background of an OS, where an input received through the computing device may trigger display of a user interface of the content selection application within a foreground of the OS. Refer to FIG. 5A and the accompanying description, which further illustrates an example where a button on a computing device triggers display of an exemplary user interface for content selection. In cases where the content selection application is running but not displayed (e.g., in a background of an OS), the content selection application may be configured to detect input received through the computing device, for example, where an action triggers display of the content selection application.

Figure 5B:
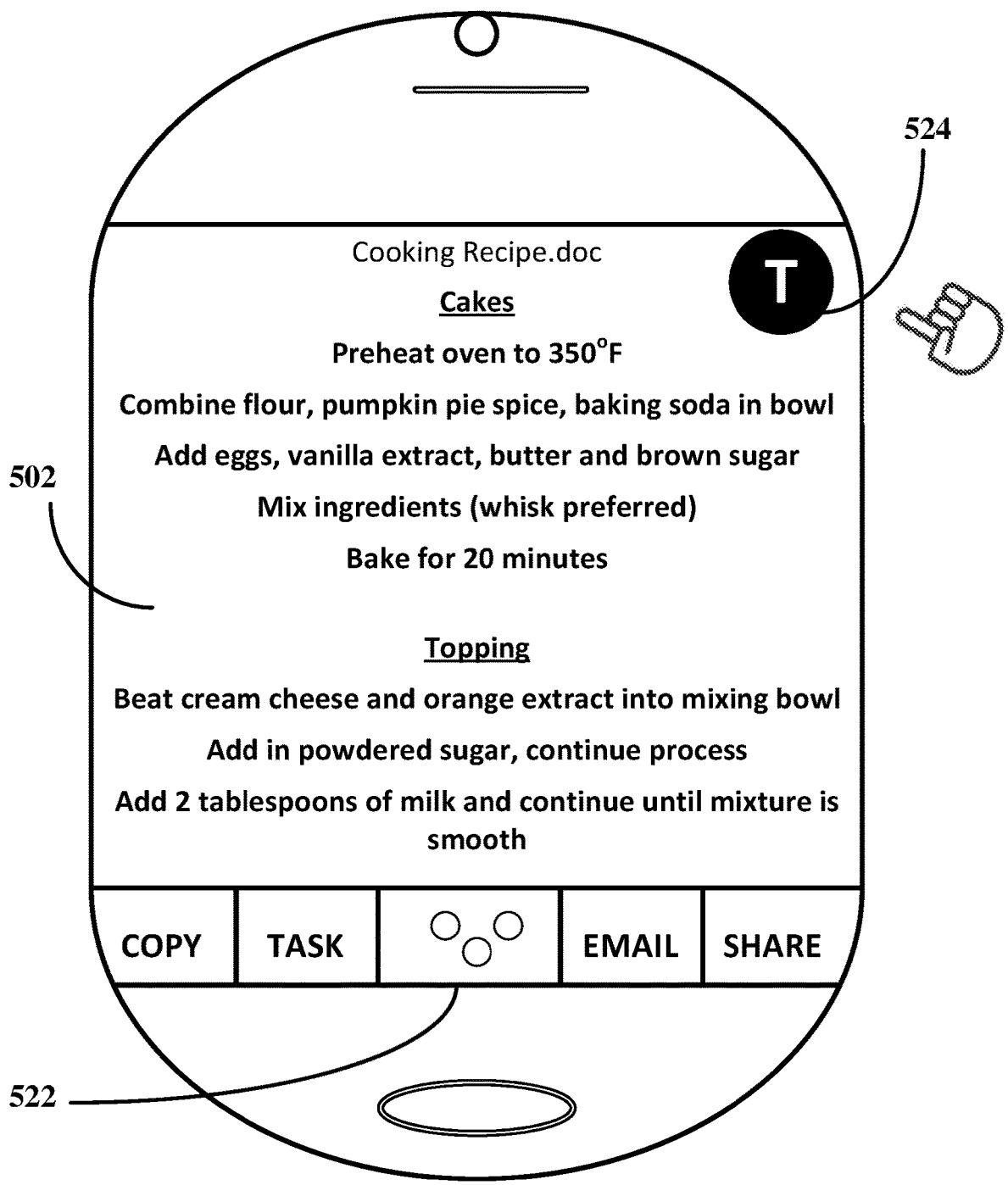
Figure 5C:
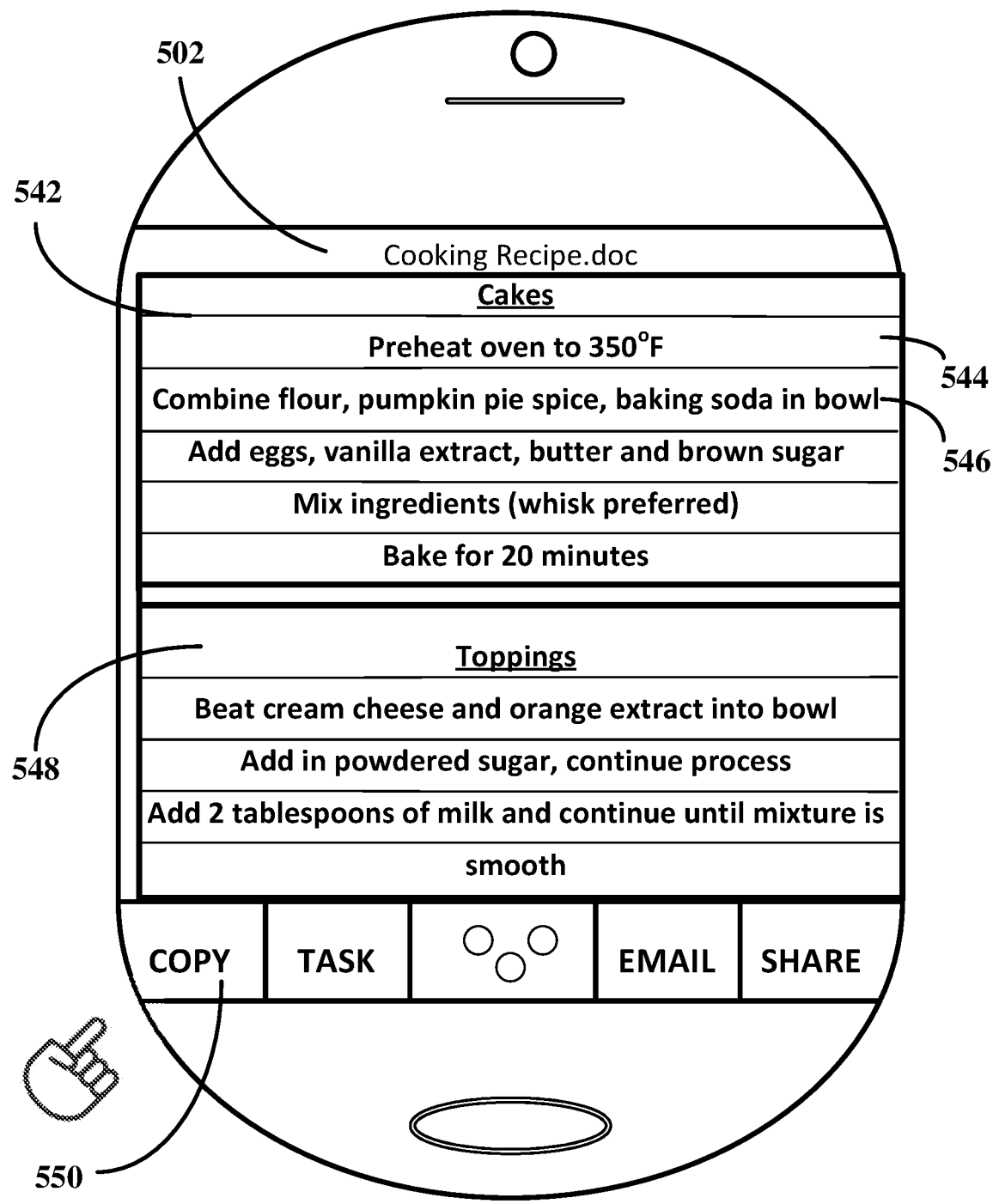

Flow may proceed to processing operation 406, where a computing device displays a layered view of executing applications. The layered view may comprise presentation of at least one executing application (processing operation 402) and the content selection application. In one example of the layered view, the content selection application is displayed in a layer that is provided over another layer representing an executing application comprising portions of content. Refer to FIGS. 5B and 5C for illustrative examples of an exemplary layered view.

In one example, an exemplary layered view presents an exemplary user interface for content selection on top of a detected foreground application based on the following processing operations. A user interface (UI) tree of a detected foreground application is accessed and evaluated. Evaluation of a UI tree for a detected foreground application may comprise identifying a plurality of UI elements associated with the detected foreground application. Out of the identified UI elements, a subset of UI elements that are most likely to be selected by a user are identified. In detecting a likelihood of a user selecting a UI element, modeling and/or statistical analysis may be applied that evaluates types of content associated with a user interface element, among other examples. For instance, UI elements associated with navigational elements, image buttons, etc. may be left out since such UI elements would not have a high likelihood of being selected by a user. An exemplary content selection application may further be configured to create interactive UI elements on top of each UI element in the subset of UI elements identified from a detected foreground application. This enables a user to select specific portions of content through a user interface for content selection while maintaining consistency with the UI elements of a detected foreground application. To create the interactive UI elements, positions and dimensions of UI elements of the detected foreground application are replicated and applied to an interactive UI element overlaying the UI element of the detected foreground application. Interactivity is then added to the interactive UI element, which can be accessed through the user interface for content selection.

The content selection application may be configured to detect an application executing in a foreground of a computing device (i.e., foreground application). When the content selection application is activated, the content selection application is layered over the detected foreground application, which provides a user with an ability to view and access content of the foreground application while having access to functionality of the content selection application. An exemplary content selection application may be configured to interface with the computing device and/or other executing applications to detect an application that is executed in the foreground of the computing device. As an example, the content selection application may employ an application programming interface (API) to detect an application that is executing in a foreground of the computing device.

During execution of the content selection application (e.g., as presented in a layered view), flow of method 400 may proceed to decision operation 408, where it is determined whether a user interface (UI) feature is selected for identifying one or more block portions of content from a detected foreground application. The content selection application is configured to provide a user interface feature that enables identification of block portions of content from a detected foreground application. Examples of an exemplary UI feature for identification of block portions of content is illustrated in FIGS. 5B and 5D and subsequently described therein. Selection of an exemplary UI feature for identifying block portions of content from a foreground application may be made in any manner including but not limited to: a tap gesture, selection via a component/device and receipt of a spoken utterance, among other examples. In one example, a tap gesture may be used to select an exemplary UI feature, where the tap gesture is a single, non-continuous action (e.g., click).

A block portion of content may contain one or more snippets of content. A snippet of content may comprise one or more words/characters/numbers/icons etc. In further examples, a snippet of content may comprise other media including images, video, audio, handwritten input, etc. In instances where text portions are being selected, a block portion of content may comprise two or more snippets of content. Alternatively, a block portion of content may comprise any combination of content types, for example, a snippet of text content and a snippet of media content. In some cases, a snippet of content may be non-selectable when using an application other than an exemplary content selection application. In at least one example, a block portion of content (selected through an exemplary content selection application) may comprise at least one snippet of content that is non-selectable in an application other than the content selection application.

An exemplary content selection application is configured to execute processing operations to identify block portions of content. For instance, the content selection application may be configured to interface with a detected foreground application to execute operations comprising any of: accessing program/source code associated with a detected foreground application, detecting a focus (e.g., on particular content) within a foreground application, parsing the program/source code to identify portions of content (e.g., evaluating types of content, delimiters, applying language understanding processing), identifying size of a block portion of content, identifying size of a bounding box for the block portion of content, identifying bounding box elements (e.g., where multiple snippets of content are included in an exemplary block portion of content), generating (e.g., pre-drawing) a bounding box to delimit exemplary block portions of content and copying exemplary block portions of content (e.g., based on UI feature selection), among other examples.

In examples, non-selectable content (e.g. text, media objects, etc.) may be identified by examining a source that is providing the content. For instance, processing operations for parsing/crawling/evaluating source code associated with providing content may be executed to identify portions of content. In cases where content is identified as not being selectable, further processing operations may be executed on the back-end to enable a portion of content to be provided through an exemplary user interface for content selection. For instance, selection/copy/paste operations may be automatically executed to present a block portion of content within an exemplary user interface for content selection. In some examples, processing operations may be executed to modify a portion of content before displaying the portion of content through the user interface for content selection. For instance, content may be unformatted or comprise misspellings or errors preventing display in a foreground application, which can be manipulated to improve an experience for a user when using an exemplary content selection application. An exemplary content selection application may interface with other applications/services to provide extensibility for the content selection application to execute processing operations including processing operations for interfacing with detected foreground applications and identification of non-selectable content from a detected foreground application, among other examples.

In instances where a UI feature for identifying block portions of content is not selected, flow branches NO and processing of method 400 remains idle until subsequent processing is received. In instances where a UI feature for identifying block portions of content is selected, flow branches YES and processing proceeds to operation 410.

At processing operation 410, one or more block portions of content are identified. In one example, processing operation 410 comprises identifying, within the layered view, the one or more block portions of content that exist within the foreground application. Block portions of content may be identified based on selection of a UI feature within the content selection application (e.g. interactive UI feature described in the foregoing). A visual result of identification (processing operation 410) is illustrated in at least FIG. 5C. Through the described user interface feature for identification of block portions of content, an exemplary content selection application automates processing of selecting an entire block portion of content without requiring a user to manually enter multiple inputs and then require a computing device to process those manual inputs. Additionally, the content selection is configured to identify a plurality of block portions of content based on a single action selecting an exemplary UI feature for identifying block portions of content. In one example, the single action is a non-continuous gesture/input (e.g., tap or click).

The disclosed identification of block portions of content provides technical advantages over functionality such as a "select all" feature in that processing efficiency as well as user interaction (with the content selection application) is improved. For instance, if a "select all" function is used to select content from an application, all content would be selected without providing the user with the flexibility of breaking out the content into several smaller block portions. A user could attempt to manually identify and select individual portions of content from a foreground application. However, as previously identified, that process is cumbersome and requires a larger number of actions to be executed to accomplish such a task.

Additionally, functionality described herein for identification of block portions content (and subsequently enabling selection of the block portions of content) is beneficial in examples where an application/service executing in a foreground does not traditionally enable select/copy/paste functionality. The exemplary content selection application interfaces with a detected foreground application to enable selection of non-selectable content. Moreover, the exemplary content selection application interfaces with a detected foreground application to extend select/copy/paste functionality, among other features, which also might not be available in other applications/services. Moreover, in further examples, an exemplary content selection application may be configured to prioritize user interface features that are displayed for a user. In at least one example, one or more user interface features displayed in a content selection user interface may be dynamically presented (or updated) based on one or more of: selected content (e.g. type, format, context, etc.), associated metadata of the content, a type of application from which the content is selected from, and types of on-going processes executing on a client computing device, among other examples. For instance, a content selection application may detect that a block portion of text content is being copied from a web browsing application and present user interface features for pasting that block portion of content in a messaging application, email application and/or word processing application.

Identification of an exemplary block portion of content comprises highlighting the block portion of content using a bounding box. As previously described, a block portion of content may comprise multiple snippets of content. In at least one example, an exemplary bounding box, generated by the content selection application, may comprise one or more individual bounding boxes (within a larger bounding box for the block portion of content), where an individual bounding box may be associated with snippets of content. In some examples, a user may choose to select/copy individual bounding boxes from a block portion of content, resulting in a selection of an individual bounding box. This can assist a user with making selections of specific parts of a block portion of content, for example, without having to click on content, drag a bounding box around the content and then select the content.

Flow may proceed to decision operation 412, where it is determined whether a selection is made of a block portion of content. As described previously, a content selection application is configured to identify block portions of content from a detected foreground application. In one example, a user may select a block portion of content through a single, non-continuous action such as tap gesture or click gesture. For instance, a user may provide input by tapping on an identified block portion of content (or individual bounding box of a block portion), which results in the content selection application selecting the block portion of content.

In alternative examples, a user may select a UI feature for an additional action (e.g., copy, task, email share), which results in an automated selection of one or more identified block portions of content.

In yet another alternative example, the single action for selecting an exemplary UI feature for identifying block portions of content may be a continuous single gesture (e.g., press and hold). This may occur when a user desires to access a functionality where the content selection application is configured to identify, select and/or copy portions of block content based on the single action. For instance, holding down an exemplary UI feature for identification of block portions of content for a shorter amount of time may identify, select and/or copy a smaller number of block portions of content than an instance where a user executes a press and hold gesture for a longer amount of time.

In instances where a block portion of content is not selected, flow branches NO and processing of method 400 remains idle until subsequent processing is received. In instances where a block portion of content is selected, flow branches YES and processing proceeds to operation 414. At processing operation 414, the content selection application selects an exemplary block portion of content, for example, based on a received user input. Subsequent actions may be taken with respect to a selected block portion of content.

For selected content, flow may proceed to decision operation 416, where it is determined whether input is received requesting an additional action with respect to selected content. In instances where an additional action is not requested, flow branches NO and processing of method 400 remains idle until subsequent processing is received. In examples where input is received requesting an additional action, flow branches YES and proceed to operation 418.

At processing operation 418, an additional action is executed based on an input received from a user. The content selection application is configured to provide user interface features that enable quick access to additional actions for selected content. Examples of additional actions include but are not limited to: copying, adding selected content to a task list, emailing the selected content, sharing the selected content with other users/applications, and editing the selected content, among other examples. In one example, an additional action executed is a copying of the selected block portion of content, for example, based on a received request to copy the selected block portion of content. Further subsequent actions may comprise pasting the block portion of content in another application based on received input to paste the block portion of content. Refer to FIGS. 5A-5D and the accompanying description illustrating an exemplary application command control for a content selection application. One skilled in the art that understands the present disclosure should recognize that application command control for the content selection may vary. For instance, an exemplary content selection application may be configured to interface with additional resources that can extend the functionality of the content selection application while improving processing efficiency for access to extensible functionality.

FIGS. 5A-5D present exemplary user interface views for processing associated with an exemplary content selection application with which aspects of the present disclosure may be practiced. User interface views shown in FIGS. 5A-5D are examples of added user interface functionality related to an exemplary content selection application and interactions between the content selection application and other applications/services. One skilled in the art that understands the present disclosure should recognize that presentation of user interface elements described herein may vary while maintaining the spirit of the present disclosure.

FIG. 5A illustrates user interface view 500. User interface view 500 is a view of a word processing application 502 executing on a mobile computing device (e.g., mobile phone). However, examples described herein are applicable to all types of computing devices. The word processing application is an example of a detected foreground application that is executing on the mobile computing device. In execution, the word processing application 502 is presenting a document ("Cooking Recipe.doc") that comprises portions of content. A user may utilize a home button 504 of the mobile computing device to trigger activation of an exemplary content selection application. For instance, a user may press and hold down the home button 504, which may trigger display of an exemplary user interface of the content selection application as part of an exemplary layered view (as described previously). In alternative examples, user interface functionality described herein may be an add-on to another type of application, where a received input may trigger display of user interface features associated with content selection. In other alternative examples, display of user interface features associated with content selection may not require a received input to trigger presentation of content selection functionality described herein. For instance, content selection functionality described herein may be incorporated within any application such as a web browsing application or personal intelligent assistant application, among other examples.

FIG. 5B illustrates user interface view 520. User interface view 520 presents an exemplary layered view that comprises a user interface of an exemplary content selection application that is layered over the word processing application 502.

User interface view 520 illustrates a layered view being presented on a mobile computing device. However, examples described herein are applicable to all types of computing devices. The content selection application comprises user interface (UI) features for application command control, which is layered over the word processing application 502. For instance, a menu 522 presents a variety of UI features that pertain to additional actions that a user can utilize for selected content. Additionally, the content selection application comprises a UI feature 524 for identification of block portions of content (e.g., "T"). A result of selection of UI feature 524 is illustrated in user interface view 540 (FIG. 5C).

FIG. 5C illustrates user interface view 540. User interface view 540 presents an exemplary layered view that comprises a user interface of an exemplary content selection application that is layered over the word processing application 502. User interface view 540 illustrates a layered view being presented on a mobile computing device. However, examples described herein are applicable to all types of computing devices. User interface view 540 presents a result of an exemplary result of selection of UI feature 524 is illustrated in user interface view 520 (FIG. 5B). Selection of UI feature 524 triggers identification of block portions of content associated with the document being presented in the word processing application 502. For instance, a first block portion of content 542 is identified by a first bounding box that is generated based on the processing operations described in method 400. A second block portion of content 548 is identified by a second bounding box that is generated based on the processing operations described in method 400. As illustrated in user interface view 540, an identified block portion of content may comprise multiple individual bounding boxes that can identify snippets of content within a block portion of content. As an example, such functionality is illustrated with respect to the first block portion of content 542, that comprises at least a first individual bounding box 544 and a second individual bounding box 546. It should be recognized that the illustrated example shows additional individual bounding boxes within the first block portion of content 542, where a user can select the additional individual bounding boxes for selection of snippets of content. While the illustrated individual bounding boxes 544 and 546 are each shown comprising a single line of text, it should be appreciated that such boxes may each comprise multiple lines of text (e.g., a sentence or paragraph over multiple lines.) It should be recognized that the second block portion of content 548 also contains a plurality of individual bounding boxes (not labeled). A user may provide input indicating a selection of one or more block portions of content (or individual bounding boxes) and further select a UI feature for an additional action from the menu 522 of the content selection application. As an example, a user selects a UI feature 550 for copying of a selected portion of content. As identified in previous examples, the content selection application enables more than one block portion of content to be selected simultaneously while maintaining individuality of the respective block portions of content. This further enables individual block portions of content to be re-selected and/or re-copied without requiring continuous gesture selection (e.g., press and hold to select a full block portion of content or execute multiple actions to re-copy the content). A result of selection of UI feature 550 is illustrated in user interface view 560 (FIG. 5D).

FIG. 5D illustrates user interface view 560. User interface view 560 is another exemplary layered view presenting a user interface of an exemplary content selection application that is layered over a messaging application 562 executing on a mobile computing device (e.g., mobile phone). User interface view 560 presents a result of an exemplary result of selection of UI feature 550 is illustrated in user interface view 540 (FIG. 5C). One skilled in the art should recognize that a user may take additional manual action to access the messaging application 562 such as launching or activating a messaging application. In another example, the content selection application may be configured to enable a user to select an application (e.g., messaging application 562) when taking additional action with respect to selected content. User interface view 560 illustrates a result of a user executing a paste operation in the messaging application 562. As illustrated in processing device view 560, selected content from the word processing application 502 is pasted in the messaging application 562. In one example, a paste operation may occur based on a selection of UI feature 564. For instance, a layered view that comprises the content selection application may include UI feature 564 displayed over messaging application 562. When content is selected (e.g., from the word processing application 502 as described in FIG. 5C), selection of UI feature 564 in user interface view 560 may trigger an operation that pastes the selected content into the messaging application 562. In some examples, the content selection application may be configured to display bounding boxes for specific block portions of content immediately upon pasting content into a new application. In other examples, a user may provide a gesture re-selecting a block portion of content, which may trigger display of a bounding box for the block portion of content.

In some alternative examples, pasting of content into another application may trigger display of a preview of the content. Alternatively, a preview of a block portion of content may be generated and displayed when content provided through the content selection application is transmitted through another application (e.g., messaging application 562). For instance, if a user selects to send a message that includes an exemplary block portion of content, that block portion of content may display as a preview in a sent message (e.g., text message). In one example, a user may select a preview to display a full representation of a block portion of content.

Figure 6:
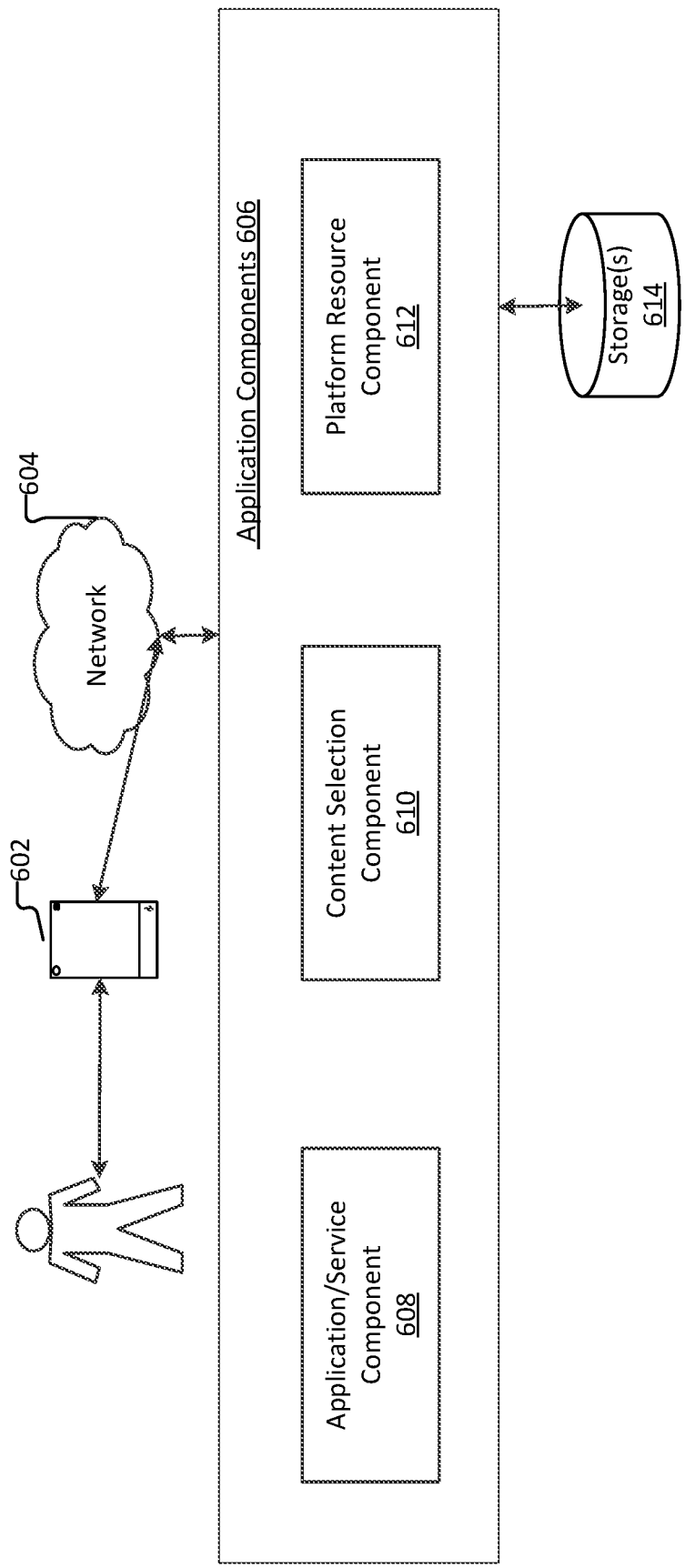
FIG. 6 illustrates an exemplary system implementable on one or more computing devices on which aspects of the present disclosure may be practiced.

FIG. 6 illustrates an exemplary system 600 implementable on one or more computing devices on which aspects of the present disclosure may be practiced. System 600 may be an exemplary system for log data evaluation and subsequent processing based on results of the log data evaluation. Components of system 600 may be hardware components or software implemented on and/or executed by hardware components. In examples, system 600 may include any of hardware components (e.g., ASIC, other devices used to execute/run an OS, and software components (e.g., applications, application programming interfaces, modules, virtual machines, runtime libraries) running on hardware. In one example, an exemplary system 600 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be executed on a processing device such as a computer, mobile device (e.g., smartphone/phone, tablet) and/or any other type of electronic devices. As an example of a processing device operating environment, refer to operating environments of FIGS. 1-3. One or more components of system 600 may be configured to execute any of the processing operations described in at least method 400 described in the description of FIG. 4 and described in the description of FIGS. 5A-5D. In other examples, the components of systems disclosed herein may be spread across multiple devices. Exemplary system 600 comprises application components 606 that further comprise: an application/service component 608, a content selection component 610 and a platform resource component 612, where each of the identified components may comprise one or more additional components.

One or more data stores/storages or other memory may be associated with system 600. For example, a component of system 600 may have one or more data storage(s) 614 (described below) associated therewith. Data associated with a component of system 600 may be stored thereon as well as processing operations/instructions executed by a component of system 600. Furthermore, it is presented that application components of system 600 may interface with other application services. Application services may be any resource that may extend functionality of one or more components of system 600. Application services may include but are not limited to: personal intelligent assistant services, productivity applications, web search services, e-mail applications, calendars, device management services, address book services, informational services, line-of-business (LOB) management services, customer relationship management (CRM) services, debugging services, accounting services, payroll services and services and/or websites that are hosted or controlled by third parties, among other examples. Application services may further include other websites and/or applications hosted by third parties such as social media websites; photo sharing websites; video and music streaming websites; search engine websites; sports, news or entertainment websites, and the like. Application services may further provide analytics, data compilation and/or storage service, etc., in association with components of system 600.

System 600 may comprise one or more storage(s) 614 that may store data associated with operation of one or more components of system 600. In examples, storage(s) 614 may interface with other components of system 600. Data associated with any component of system 600 may be stored in storage(s) 614, where components may be connected to storage(s) 614 over a distributed network including cloud computing platforms and infrastructure services. Exemplary storage(s) 614 may be any of a first-party source, a second-party source, and a third-party source. Storage(s) 614 are any physical or virtual memory space. Storage(s) 614 may store any data for processing operations performed by components of system 600, retained data from processing operations, stored programs, code or application programming interfaces (APIs), training data, links to resources internal and external to system 600 and knowledge data among other examples. Furthermore, in examples, components of system 600 may utilize knowledge data in processing by components of system 600. Knowledge may be used by one or more components of system 600 to improve processing of any of the application components 606 where knowledge data can be obtained from resources internal or external to system 600. In examples, knowledge data may be maintained in storage(s) 614 or retrieved from one or more resources external to system 600 by knowledge fetch operation. In examples (as described below) storage(s) 614 may store exemplary data programs/services and other types of data for: execution of applications/services including an exemplary content selection application, interfacing between applications/services (e.g. interaction between the content selection application and other executing applications), detection of applications in a foreground, evaluation of content associated with application/services, identification of block content, selection of block content, subsequent actions for selected block content, application command control including user interface features of an exemplary content selection application, interaction with a computing device, retrieval of knowledge data, user specific data and application specific data among other examples.

In FIG. 6, processing device 602 may be any device comprising at least one processor and at least one memory/storage. Examples of processing device 602 may include but are not limited to: processing devices such as desktop computers, servers, phones, tablets, phablets, slates, laptops, wearable computing devices and any other collection of electrical components such as devices having one or more processors or circuits. In one example processing device 602 may be a device of a user that is executing applications/services. In examples, processing device 602 may communicate with the application components 606 via a network 604. In one aspect, network 404 is a distributed computing network, such as the Internet. Application services may communicate with application components 606 via the network 604. Processing device 602 may be a device as described in the description of FIGS. 1-3. In some examples, processing device 602 may comprise multiple connected devices. Processing device 602 is an example of a user computing device.

The processing device 602 may execute processing operations that include an ability to access an application/service through a user account. In one example, processing device 602 may connect an authenticated user to an exemplary application/service that stores user data for one or more users of the application/service. An exemplary storage application/service may provide a user of processing device 602 with access to data stored in an exemplary data center. In one example, processing device 602 may be connected with storage(s) 614 via a distributed network, which may provide users with access to user data. One or more tenant resources (e.g. Tenant Resource A, Tenant Resource B, Tenant Resource C, etc.) may be associated with processing device 602. A tenant resource may be a user account associated with a processing device and/or distributed network service. Data associated with a tenant resource may be stored on storage(s) 614, where a tenant account can be utilized to access stored data by processing device 602 and/or other processing devices.

The application components 606 are a collection of components that interface to enable processing of an exemplary content selection application/service. As identified above, application components 606 may comprise: an application/service component 608, a content selection component 610 and a platform resource component 612.

The application/service component 608 is a component that is configured to execute and management applications other than an exemplary content selection application. The content selection component 610 may interface with the application/service component 608 to detect a foreground application and present exemplary layered views that comprise the content selection application. Among other examples, the application/service component 608 may also provide access to access to source code enabling the content selection component 610 to identify block portions of content including portions of content that are non-selectable directly through an application/service.

The content selection component 610 is a component that is configured to execute processing operations described in at least method 400 (FIG. 4). Further examples of processing operations of the content selection component 610 are described in the description of FIGS. 5A-5D. In alternative examples, the content selection component 610 may be configured to provide functionality and/or add-ons in other existing applications. For instance, features provided by the content selection application may be incorporated into application command control of other executing applications.

The platform resource component 612 is a component that is configured to interface with the content selection component 610 to extend functionality of an exemplary content selection application. As an example, the platform resource component 612 may provide application services (previously described) that enhance processing by an exemplary content selection application.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
executing, by a computing device, a first application that comprises content;
receiving, by the computing device, an input that triggers activation of a user interface for a content selection application;
displaying, based on the received input, a layered view that presents the user interface of the content selection application layered over the first application;
presenting, through the user interface of the content selection application, a plurality of block portions of content of the first application wherein each of the plurality of block portions of content is respectively identified by a bounding box;
receiving, through the user interface, a single and non-continuous click action for selection of a block portion of the plurality of block portions of the content; and
in response to a receipt of the single and non-continuous click action, selecting, via the content selection application, the block portion of the content.

2. The method of claim 1, wherein the single and non-continuous click action is a device input.

3. The method of claim 1, wherein the single and non-continuous click action is a touch input.

4. The method of claim 1, further comprising: receiving, through the content selection application, a selection of a user interface feature for copying the selected block portion of the content; and copying the selected block portion of the content based on the received selection for copying the selection block portion of the content.

5. The method of claim 4, further comprising: receiving, through the content selection application, a user interface selection to paste the selected block portion of the content; and pasting the block portion of the content in another application based on the received selection to paste the selected block portion of the content.

6. The method of claim 1, further comprising: receiving, through the content selection application, a selection of a user interface feature for identifying block portions of content within the first application, and wherein the plurality of block portions of content is presented in the user interface based on the received selection of the user interface feature.

7. The method of claim 1, further comprising: detecting, via the content selection application, source code associated with the content of the first application, and wherein the block portion of content is selected from the first application based on an analysis of the detected source code.

8. A system comprising:
at least one processor; and
a memory operatively connected with the at least one processor storing computer-executable instructions that, when executed by the at least one processor, causes the at least one processor to execute a method that comprises:
executing, by a computing device, a first application that comprises content;
receiving, by the computing device, an input that triggers activation of a user interface for a content selection application;
displaying, based on the received input, a layered view that presents the user interface of the content selection application layered over the first application;
presenting, through the user interface of the content selection application, a plurality of block portions of content of the first application wherein each of the plurality of block portions of content is respectively identified by a bounding box;
receiving, through the user interface, a single and non-continuous click action for selection of a block portion of the plurality of block portions of the content; and
in response to a receipt of the single and non-continuous click action, selecting, via the content selection application, the block portion of the content.

9. The system of claim 8, wherein the single and non-continuous click action is a device input.

10. The system of claim 8, wherein the single and non-continuous click action is a touch input.

11. The system of claim 8, wherein the executed method further comprises: receiving, through the content selection application, a selection of a user interface feature for copying the selected block portion of the content; and copying the selected block portion of the content based on the received selection for copying the selection block portion of the content.

12. The system of claim 11, wherein the executed method further comprises: receiving, through the content selection application, a user interface selection to paste the selected block portion of the content; and pasting the block portion of the content in another application based on the received selection to paste the selected block portion of the content.

13. The system of claim 8, wherein the executed method further comprises: receiving, through the content selection application, a selection of a user interface feature for identifying block portions of content within the first application, and wherein the plurality of block portions of content is presented in the user interface based on the received selection of the user interface feature.

14. The system of claim 8, wherein the executed method further comprises: detecting, via the content selection application, source code associated with the content of the first application, and wherein the block portion of content is selected from the first application based on an analysis of the detected source code.

15. A computer storage non-transitory media storing computer-executable instructions that, when executed by at least one processor, causes the at least one processor to execute a method comprising:
   executing, by a computing device, a first application that comprises content;
   receiving, by the computing device, an input that triggers activation of a user interface for a content selection application;
   displaying, based on the received input, a layered view that presents the user interface of the content selection application layered over the first application;
   presenting, through the user interface of the content selection application, a plurality of block portions of content of the first application wherein each of the plurality of block portions of content is respectively identified by a bounding box;
   receiving, through the user interface, a single and non-continuous click action for selection of a block portion of the plurality of block portions of the content; and
   in response to a receipt of the single and non-continuous click action, selecting, via the content selection application, the block portion of the content.

16. The computer storage non-transitory media of claim 15, wherein the single and non-continuous click action is one selected from a group consisting of: a device input and a touch input.

17. The computer storage non-transitory media of claim 15, wherein the method further comprising: receiving, through the content selection application, a selection of a user interface feature for copying the selected block portion of the content; and copying the selected block portion of the content based on the received selection for copying the selection block portion of the content.

18. The computer storage non-transitory media of claim 17, wherein the method further comprising: receiving, through the content selection application, a user interface selection to paste the selected block portion of the content; and pasting the block portion of the content in another application based on the received selection to paste the selected block portion of the content.

19. The computer storage non-transitory media of claim 15, wherein the method further comprising: receiving, through the content selection application, a selection of a user interface feature for identifying block portions of content within the first application, and wherein the plurality of block portions of content is presented in the user interface based on the received selection of the user interface feature.

20. The computer storage non-transitory media of claim 15, wherein the method further comprising: detecting, via the content selection application, source code associated with the content of the first application, and wherein the block portion of content is selected from the first application based on an analysis of the detected source code.

* * * * *